United States Patent
Reynolds

[11] 3,825,336
[45] July 23, 1974

[54] VARIABLE COLOR PHOTOGRAPHIC LIGHTING SOURCE

[75] Inventor: Robert Reynolds, Yuma, Ariz.

[73] Assignee: Polaroid Corporation, Cambridge, Mass.

[22] Filed: Jan. 4, 1973

[21] Appl. No.: 320,951

[52] U.S. Cl.................. 355/1, 240/1 EI, 350/96 B, 355/37
[51] Int. Cl............................................ G03b 27/76
[58] Field of Search ........... 355/1, 35, 37; 240/1 EI; 350/96

[56] References Cited
UNITED STATES PATENTS

| 3,011,388 | 12/1961 | Baumbach et al................ 355/35 X |
| 3,043,179 | 7/1962 | Dunn.................................. 355/1 X |
| 3,217,594 | 11/1965 | Simmon............................... 355/1 |
| 3,492,070 | 1/1970 | Zahn.................................. 355/37 |

*Primary Examiner*—Samuel S. Matthews
*Assistant Examiner*—Richard A. Wintercorn
*Attorney, Agent, or Firm*—John S. Vale

[57] ABSTRACT

A variable color light source which is especially well suited for use in a photographic printer or enlarger for balancing the color of the light source such that it is compatable with particular photosensitive materials. The variable color light source features a fiber optic light mixing device for receiving different colored light, e.g., red, green and blue light, and combining the different colored light to form light of a composite color. By varying the intensity of the different colors of light, the composite color may be changed.

29 Claims, 5 Drawing Figures

VARIABLE COLOR PHOTOGRAPHIC LIGHTING SOURCE

BACKGROUND OF THE INVENTION

1. Field of the Invention

The present invention relates to the field of photography and, more particularly, to a variable color light source for use in photographic enlargers or printers.

2. Description of the Prior Art

Reproducing color photographs on a commercial basis generally involves the use of high-speed automated printers. In one system, where the copies are to be made from a positive print, individual prints are photographed with a copy camera employing a large roll of film. The roll of film is developed to produce color internegatives.

The roll of internegatives is loaded into an enlarging printer which also holds a roll of suitable color printing paper.

The internegatives are sequentially advanced to a printing station where they are illuminated and projected onto the roll of advancable printing paper. Once the printing phase is complete, the roll of printing paper is developed to produce positive prints.

It is well known in the photographic art that color film and positive print paper may vary from batch to batch in terms of color balance. Therefore, it is a common practice to test the film and paper combination for color balance before printing. Based on the test results, the color of the light source in the printer or enlarger is adjusted to compensate for any imbalance.

One method used to adjust the color of a "white" light source is to place one or more subtractive yellow, cyan, and magenta filters between the light source and the negative. Major disadvantages of such a system are that the filters are costly, short-lived, and being incremental only permit step adjustments in color.

An alternative method for color balancing a light source is the additive system wherein individual sources of red, green, and blue light are combined or additively mixed to produce "white" light. One advantage of this system is that the color of the composite light may be continuously varied over a wide range of colors by varying the amounts of the three primary colors being used to illuminate the negative. For example, the intensity of each of the three sources may be adjusted to vary the composite color.

On the other hand, the adjustment may be made on a time base. The red light source may operate for a relatively short time during exposure while the green and blue sources operate for a longer time period. An example of an additive light source system utilizing the time base method may be found in U.S. Pat. No. 3,120,782.

A major problem associated with the prior art additive light systems is its lack of efficiency in terms of light utilization. Generally, the inefficiency occurs at the point where the three primary colors are mixed or combined.

Some systems use a frosted glass plate as a diffuser coupled with other reflective devices to mix the red, green, and blue light. Other systems employ an integrating sphere or dome for combining the light by multiple internal reflections. In the previously cited U.S. Pat. No. 3,120,782, reference is made to a "light integrating bar" for combining the three primary colors. It apparently employs multiple reflections within a glass or transparent plastic cylinder.

Each of the above-mentioned mixing devices is a relatively low efficiency light transmitter. In order to provide adequate light levels at the negative for short exposure times, high wattage lamps must be employed at the input end of the mixing devices. This in turn causes excessive heat to be generated within the lighting system. The heat problem either limits the size of the lamps that can be used, thereby extending exposure time, or requires that complex heat reducing or cooling aids be built into the system.

SUMMARY OF THE INVENTION

The present invention provides a variable color light source for use with a photographic printer or enlarger.

In a preferred embodiment, the light source comprises individual sources of red, green, and blue light; means for individually varying the intensity of these three primary color light sources; and a unique, highly efficient, fiber optic light-mixing device for additively mixing various intensities of red, green, and blue light to produce light of a composite color.

The mixing devices comprise first, second and third incoherent bundles of individual optic fibers, each bundle having an input end and an output end.

The input end of each of the three fiber optic bundles is optically coupled to one of the three primary color light sources. The output ends of the three bundles are joined together by interweaving the individual optic fibers forming the bundles to form a common composite output end of the mixing device.

The individual fibers are arranged in a systematic manner, alternating fibers from each of the three bundles, to form a mosaic or reseau at the composite output end of the device.

Looking at the composite output end, one sees a geometric array of individual fiber ends clustered in groups of three transmitting red, green, and blue light. As the light is transmitted beyond the ends of the fibers in expanding and overlapping cones, the primary colors mix to form a composite additive color.

When the intensity of all three of the primary color sources is the same, the composite light is "white." By changing the relative intensities of the lamps, the composite color may be changed.

This unique system retains the favorable characteristic of providing continuous color changes rather than step-wise alterations, yet it does not suffer the drawbacks of the prior art systems.

Because of the high light transmission efficiency of the fiber optic bundles, the light levels needed at the input end of the light-mixing device are relatively low.

The use of incoherent fiber optic bundles provides another advantage. Because the light from the red, green, and blue light sources is "scrambled" as it is transmitted along the bundles, irregularities or "hot-spots" in the incandescent lamp filaments of the primary color light sources are not discernible at the composite output end of the device. This provides more uniform illumination over the entire area of the negative.

Also, because the fiber optic bundles may be flexed, bent, or twisted without disturbing the performance of the device, the input ends of the bundles and the red, green, and blue light sources need not be located in alignment with the composite output end of the mixing device. This allows the designer considerable latitude in positioning the three primary light sources within the printer or enlarger.

While the mixing device is primarily described as being configured for combining light from three independent light sources, alternate embodiments are disclosed for mixing light from two, four or even more independent light sources.

Therefore, it is an object of the present invention to provide a simple, easy to use, inexpensive, and highly efficient variable color additive light source for use with a photographic enlarger or printer.

It is another object of the invention to provide such a variable color light source which includes two or more different colored light sources, means for independently varying the intensity of such light sources, and means including a fiber optic mixing device for additively combining the light from the two or more sources to produce light of a composite color.

It is another object of the present invention to provide a fiber optic mixing device comprising a plurality of incoherent bundles of optic fibers, each of the bundles having an input end and an output end and being formed by a plurality of randomly interwoven optic fibers, said input end of each bundle being optically coupled to a light source of a different color and the output ends of all of said bundles being interwoven in a systematic manner to form a composite common output end for additively combining the different colored lights as they are transmitted from the composite output end.

It is yet another object of the present invention to provide a photographic enlarger or printer which includes a variable color light source formed in part by a fiber optic light-mixing device.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
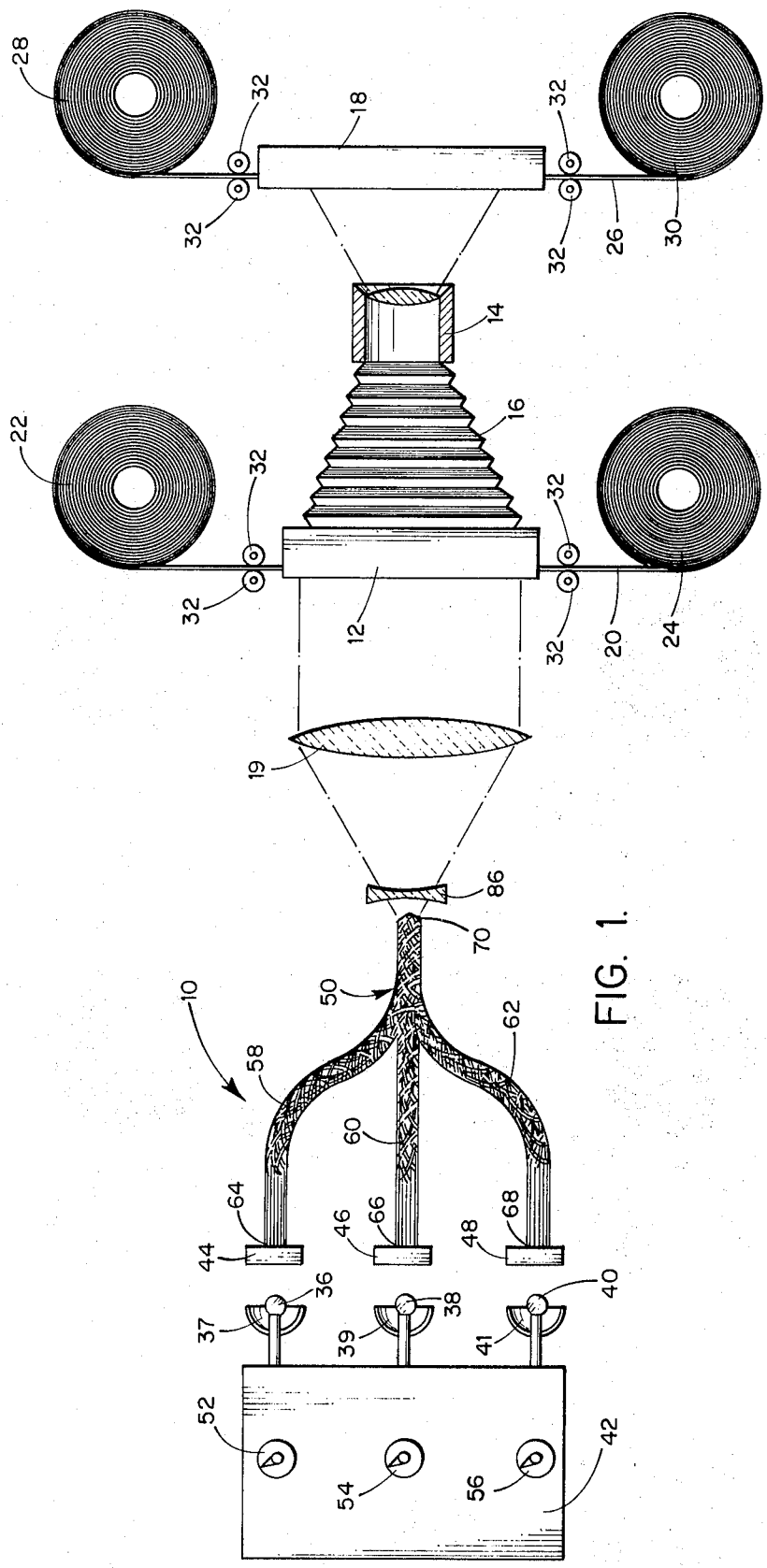
FIG. 1 is a diagrammatic representation of a photographic enlarger or printer showing a variable color light source embodying the instant invention in operative relation with the optical system of the enlarger or printer, said variable color source comprising red, green, and blue light sources, a power supply for independently varying the intensity of each of the three sources, and a fiber optic light-mixing device.

FIG. 1 shows, in diagrammatic form, a variable color light source 10 in operative relation with the essential elements of a typical commercial color enlarging printer.

The printer comprises a negative or film support member 12; an enlarging or projection lens 14 coupled to support member 12 by an expandable bellows 16; a positive print paper support 18 and a condensing lens 19 positioned behind the negative support 12.

The color negatives or internegatives to be reproduced are supplied in a long roll of film 20 coupled between a supply reel 22 and a take-up reel 24 disposed on opposite sides of the film support member 12. The print paper 26 is also supplied in a long roll that is coupled between a supply reel 28 and a take-up reel 30 disposed on opposite sides of the print paper support 18.

The film or color negative material 20 and the print paper 26 are adapted to be intermittently advanced within their respective support members 12 and 18 by suitable indexing drive means (not shown) connected to their respective supply and take-up reels 22, 24, 28 and 30. It will be noted that film 20 and paper 26 may be properly aligned with their respective support members by employing guide rollers 32 at the entrance and exit ends of support members 12 and 18. In some types of printers, the rollers 32 may be rotatably driven to provide at least a portion of the transport function.

With a color negative or transparency supported in member 12 in alignment projection lens 14, light from source 10 is directed through condensing lens 19 to illuminate the negative. An image of the illuminated negative is projected by lens 14 on the positive print paper or photosensitive method 26 to form a latent image therein during an appropriate exposure interval. If a second copy is to be made, the print paper 26 is indexed one frame and the exposure sequence is repeated. After an appropriate number of exposures have been made, both the film 20 and the paper 26 are indexed one frame to begin making positive prints of the next negative on the roll.

After the roll of print paper has been exposed, it is transferred to an appropriate apparatus for processing.

The above brief description of the enlarging printer is provided to illustrate a typical operating environment for the light source 10. It will be understood that the scope of the present invention goes beyond the bounds of the described printer and that the light source 10 may be used with other types of photographic enlargers (including the type accepting only one negative at a time) and photographic printing apparatus.

As noted earlier, a color print produced by projecting an image of the color negative onto the positive print paper with a "white" light source may not be color balanced due to some color imbalance in the negative, or positive paper, or both. Other sources of color variation may be attributed to the color of the light source used when the negative was exposed in the camera, the type of processing chemicals used, etc.

In any event, a test print will generally indicate that some adjustment in the color of the enlarger's light source is necessary to produce a better balanced positive print.

For example, if the positive print has an overall yellow cast, then the blue-sensitive layer of the positive print paper, which is responsible for formation of yellow dye in the print is receiving too much blue light.

The print may be color balanced by reducing the amount of blue light in the light source illuminating the negative.

In subtractive processes, blue light is suppressed or absorbed by placing a yellow filter in front of the "white" light source.

In additive light source systems, where the "white" light is generated by additively mixing red, green, and blue light, the color balance is restored by reducing the intensity of the blue light source, or increasing the red and green, thereby providing a composite color having a reduced blue content.

The amount of enlarger light source correction is determined by various test methods such as densitometer readings to step wedge tests. Such test methods are well known to those having ordinary skill in the art of making color prints and, therefore, they will not be discussed further within the instant disclosure.

A variable color light source 10 embodying the instant invention comprises: three tungsten lamps 36, 38, and 40, each having its own parabolic focusing reflector (37, 39, and 41, respectively) associated therewith; a three channel power supply 42 connected to the lamps 36, 38, and 40 for individually powering and varying the intensity of each of the lamps 36, 38, and 40; red, green, and blue filters 44, 46, and 48 positioned in front of lamps 36, 38, and 40, respectively; and a fiber optic light-mixing device 50 optically coupled to the three primary colored filters 44, 46, and 48.

In a preferred embodiment, the power supply 42 is of the constant voltage type to counteract any fluctuations in the line voltage feeding it. It is divided into three separate channels for independently powering each of the three lamps 36, 38, and 40. Each power channel is provided with a control member, for varying the power input to each of the lamps, preferably by varying the voltage input thereto. In FIG. 1, the individual control members are represented as knobs or dials. Knob 52 regulates the voltage input to lamp 38, and knobs 54 and 56 are used to control lamps 38 and 40, respectively.

The red filter 44 positioned in front lamp 36 and reflector 37 transmits red light and absorbs the other colors in the spectrum emitted from the tungsten lamp 36. Thus filter 44, lamp 36, reflector 37, and a portion of power supply 42 may be considered to be a "source of red light" for the purposes of this disclosure. Knob 52 is representative of a portion of the power supply that is used to regulate or vary the intensity of the "source of red light" by changing the power input or voltage to lamp 36. This same definition applies to the other lamps, filters, and control knobs. Thus the light source 10 is to be considered as including a source of red light, a source of green light, a source of blue light, and means connected to these sources of colored light for independently varying their respective intensities.

The light outputs of the red, green, and blue sources are fed into the input end of the fiber optic mixing device 50 and are additively mixed as they emerge from the output end to form light of a composite color. When the red, green, and blue light outputs are of substantially equal strength, the composite color is "white." One may think in terms of "white" light as being a balanced light with no one primary color being dominant.

The fiber optic mixing device comprises three separate incoherent bundles 58, 60, and 62 of optic fibers. The input end 64 of bundle 58 is optically coupled to the source of red light to receive its light output and transmit the output along its length in an incoherent manner with a minimum of light loss. Similarly, the input end 66 of bundle 60 and the input end 68 of bundle 62 are optically coupled to the green and blue light sources.

The opposite ends, or output ends, of the fiber optic bundles are joined together (or more precisely interwoven in a manner to be described hereinafter) to form a composite output end 70 of light-mixing device 10.

Each of the incoherent bundles 58, 60, and 62 is formed by a plurality of individual, flexible, light transmitting, optic fibers, each of which has an input end and an output end.

Each of the flexible fibers is formed by an inner core having a first index of refraction and an outer sheath, covering the core, having a second index of refraction which is lower than the first index of refraction. The interface between the sheath and core provides an environment for highly efficient light transmission along the length of the fiber by multiple internal reflections. Since the light is substantially totally internally reflected, the fiber may be bent or curved without light loss.

The fibers may be made of coated glass or coated plastic. The glass fibers are more suitable for high temperature applications but are less flexible than the plastic fibers. Experience has shown that plastic fibers may be used in the mixing device 10.

The three bundles 58, 60, and 62 are incoherent in nature. That is to say that they are formed by a plurality of individual fibers that are interwoven along their length in a random manner to form the bundle.

This is in contrast to a coherent bundle where the fibers are laid up in systematic parallel fashion so that an end of an individual fiber at the input end of the bundle occupies the same relative position to the fiber ends around it at the output end. Coherent fiber bundles are used for image transmission applications wherein it is desirous to maintain the coherency of the image from the input end of the fiber bundle to its output end.

In the instant application, the input ends of the fiber optic bundles 58, 60, and 62 "look at" the glowing filaments of lamps 36, 38, and 40 through the filters 44, 46, and 48.

Lamp filaments tend to develop "hot spots" with age. That is, the light output tends to become non-uniform along the length of the filament. If coherent fiber optic bundles were employed, the non-uniform light output would be transmitted along the light-mixing device and illuminate the negative at negative support 12 in an uneven manner.

By employing incoherent bundles of fiber optics, the image of the filament is scrambled as it is transmitted along each bundle and therefore the light output from the end of the bundle is more even in its distribution. A cluster of fibers at the imput end of the bundle "seeing" a hot spot will not be clustered at the output end thereby redistributing portions of the hot spot or dispensing it at the output end of the bundle.

While the individual fiber forming the incoherent bundles 58, 60 and 62 are randomly interwoven within each bundle, they are interwoven together at their respective output end to form the composite output end 50 in a systematic manner to provide an ordered distribution of fibers carrying red, green, and blue light.

Figure 2:
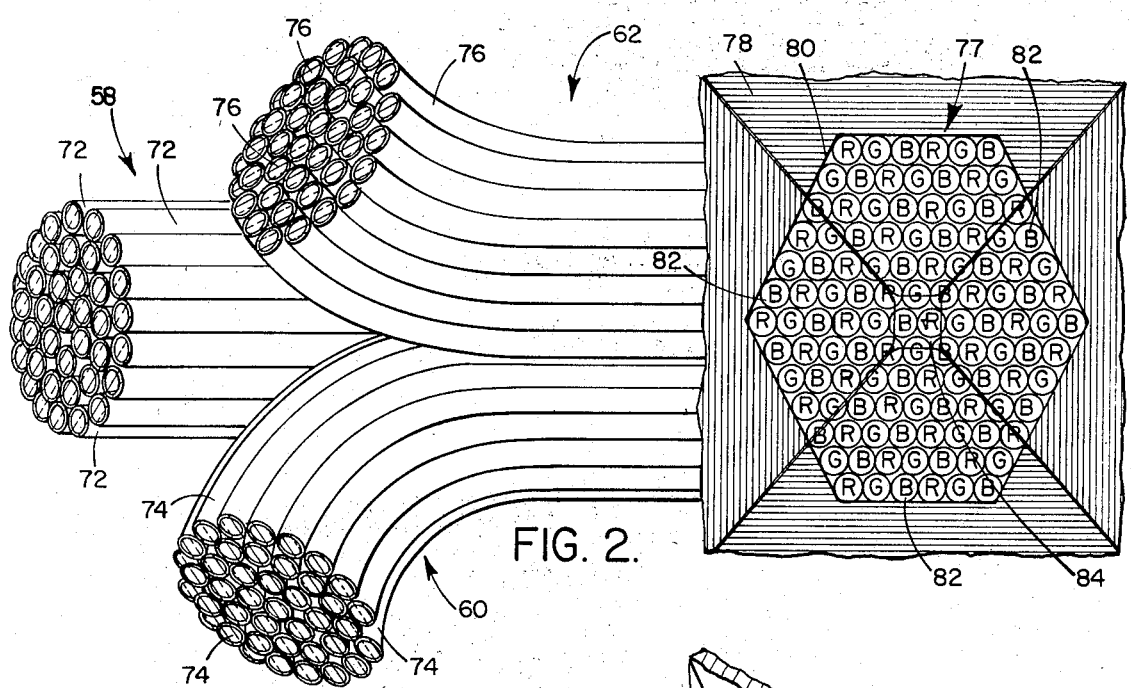
FIG. 2 is a perspective view of a composite output end of the fiber optic mixing device showing the systematic arrangement of the interwoven optic fibers from three incoherent bundles of fibers forming the mixing device.

Referring now to FIGS. 1 and 2 of the drawings, the three incoherent bundles 58, 60, and 62 are joined or interwoven together at their respective output ends to form the composite output end 70 of mixing device 50. For the sake of clarity, the individual optic fibers forming bundle 58 will be designated as fibers 72. The optic fibers in bundles 60 and 62 will be designated 74 and 76.

The individual fibers of the three bundles are arranged in a systematic order to form a mosaic or reseau 77 at composite output end 70. In a preferred embodiment, the reseau 77 is hexagonal in cross section, but it may take other shapes, e.g., a circle, square, triangle, rectangle, or other shape as may be desired or needed. In the illustrated embodiment, a metal or plastic collar 78, having a hexagonal opening 80 therein, is used to facilitate the laying up of the systematic reseau and for holding the fibers in a close packed relationship.

Starting at the upper left-hand corner of the reseau 77, a first row of fibers is established by alternating fibers from each of the three fiber optic bundles. The first row of the reseau 77 begins with a fiber 72. It is followed with a fiber 74 which is followed by a fiber 76. This same pattern is repeated to complete the first row.

The second row of the reseau 77 is substantially parallel to the first row, but because of the circular cross section of the ends of the individual fibers 72, 74, and 76, the fibers of the second row are interdigitated with respect to the fibers of the first row to achieve maximum packing density. From left to right the sequence of fibers is 74, 76, 72 74, 76, 72, 74. The third row is substantially parallel to the first and second rows and its fibers are in turn interdigitated with those of the second row. The fiber sequence of the third row, from left to right, is 76, 72, 74, 76, 72, 74, 76, 72. The next 10 rows of the reseau 77 are formed by repeating the pattern established in the first three rows.

For the ease of illustration, the output ends of the individual fibers 72, 74, and 76 carry the designation R, G, and B, respectively, to indicate that fibers 72 carry red light to the end of the reseau while fibers 74 and 76 carry green and blue light, respectively.

It will be noted that the reseau is made up of a repeating pattern of triangular clusters of fibers, each of which includes red, green, and blue light transmitting fibers 72, 74, and 76. For example, one triangular cluster is formed by the first fiber 72 in the first row and the first and second fibers, 74 and 76, in the second row. Another triangular cluster is formed by the first two fibers, 72 and 74, in the first row and the second fiber 76 in the second row. A substantially equal number of fibers 72, 74, and 76 are used to form the reseau 77 and they are envenly distributed with the resau 77.

Figure 3:
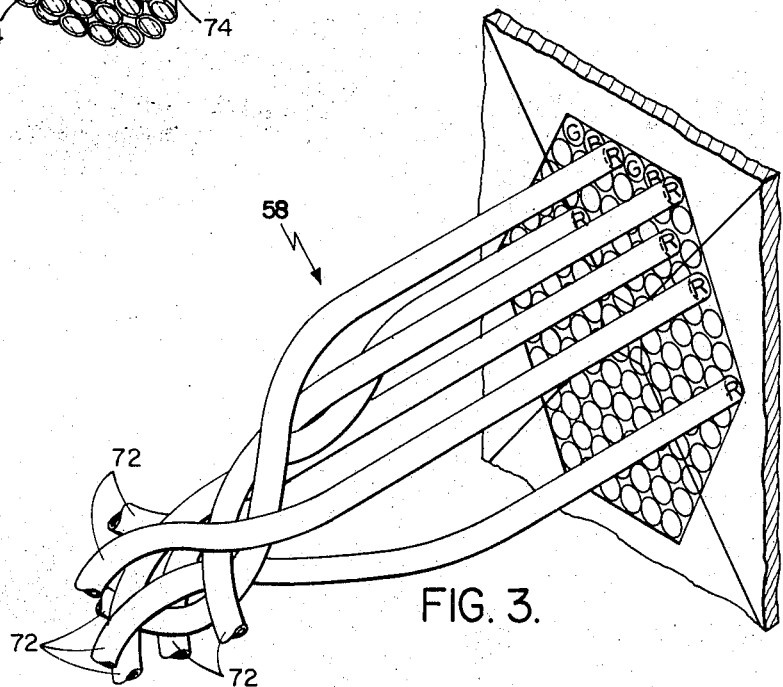
FIG. 3 is a perspective view of the composite output end of the mixing device showing the incoherent nature of one of the three fiber optic bundles.

FIG. 3 shows a rear view of the reseau 77 and representative fibers 72 of incoherent bundle 58 only. This is to illustrate the incoherent nature of bundle 58. It will be noted that the individual fibers 72 are randomly interwoven along their length before they reach the reseau 77. As noted previously, this type of bundle structure prevents a coherent image of the filament of lamp 36 from being transmitted to the output end 70 which may lead to an uneven distribution of red light at the reseau thereby causing uneven illumination of the negative supported by the support member 12.

Fiber optic mixing devices employing three coherent bundles of optic fibers systematically interwoven at their output ends have been used to transmit and integrate red, blue, and green images in a television system. Examples of such mixing devices may be found in U.S. Pat. Nos. 3,043,179 and 3,130,263.

The mixing device 50 of the instant invention employs incoherent bundles rather than coherent bundles to scramble the information being transmitted rather than faithfully reproduce it at the output end.

As noted earlier, the mixing of the red, green, and blue light does not occur within mixing device 50 but rather at a point slightly beyond the composite output end 70. The red, green, and blue light emerges from the output ends of their respective individual fibers 72, 74, 76 and propagates therefrom in expanding cones of light radiating outwardly about a longitudinal transmission axis of device 50. Because of the close pack density of the fibers, the adjacent red, green, and blue cones of light overlap at a very short distance from composite output end 70 thereby additively mixing to form light of a composite color.

The composite color light also propagates from the output end 70 in an expanding cone of light. Assume for the moment that the output ends of the individual fibers 72, 74, and 76 forming the reseau 77 terminate in a common plane so that the output end 70 of mixing device 50 is substantially flat. The cone of composite light subtends a solid angle which is mainly a function of the diameters of the individual fibers 72, 74, and 76. Fine diameter fibers will generate a relatively small solid angle while coarser fibers will generate a larger solid angle. By increasing the number of fibers 72, 74, and 76 forming the reseau, the solid angle is increased slightly, but for the most part it is defined by fiber size, not number. The number of individual fibers in the reseau (assuming that they all transmit substantially the same amount of light) will determine the intensity of the composite light at any given distance from the composite output end 70.

In some instances, the cone of light emanating from the composite output end 70 of a mixing device 50 having a planar reseau 77 may be too small to completely fill the condensing lens 19 of the printer or enlarger.

One solution to this problem is to shape the composite output end 70 such that it disperses or bends the light rays transmitted therefrom outwardly from the longitudinal transmission axis. As best shown in FIG. 2, the composite output end is suitably ground and polished such that it includes four substantially triangular shaped facets 82. The reseau rather than being disposed in a single plane that intersects the longitudinal transmission axis of the combined bundles 58, 60, and 62, now exhibits a pyramidal shape, having its apex 84 at the leading edge of end 70, with all but a few individual fibers at the center, being disposed on one of the four inclined facets 82.

The number of facets and their angle relative to the output transmission axis may be varied depending on the degree of dispersion required. Optically, each of the facets acts as a prisim mounted on the end of the combined fiber optic bundle and provides, by its shape, the means for bending the light rays emerging from the composite output end 70 to increase the solid angle subtended by the cone of composite color light.

Another method for increasing the solid angle or "field of illumination" is to employ an appropriate negative dispersing lens 86 between the reseau 77 and the condensing lens 19. As shown in FIG. 1, even greater dispersion may be achieved by combining both methods. The faceted output end 70 of the mixing device 50 directs the composite light output to a negative lens 86 positioned in alignment therewith which in turn further expands the "field of illumination" to completely fill the condensing lens 19.

In operation, the combination of a particular roll of negative material 20 and a particular roll of positive print paper 26 is tested for color balance. If no imbalance is found, the intensities of lamps 36, 38, and 40 are adjusted so that substantially the same amounts of red, green, and blue light are transmitting into the input ends 64, 66, and 68, respectively, the three incoherent bundles of the optic fibers 58, 60 and 62. The light travels along the individual fibers 72, 74, and 76 forming the three bundles 58, 60, and 62 and emerges from the reseau 77 at the composite output end 70. Upon leaving the output end 70, the red, green, and blue light additively combine to form "white" light. Being further dispensed by the negative lens 86, the white light fills the condensing lens 19 which in turn directs it to the negative support 12 to illuminate a colored negative supported thereon. An image of the illuminated negative is then projected onto print paper 26 on support member 18 by lens 14 to form a latent image therein.

If the test indicates an imbalance in the combination of negative and positive material, the color of the composite light is adjusted by varying the intensity of one or more of the lamps 36, 38, and 40. For example, if positive test print is too yellow, the voltage input to lamp 40 is reduced to decrease the amount of blue light being fed into the mixing device 50 through incoherent bundle 62. In order to maintain the intensity of composite color light output at some predetermined value, a reduction of power input to lamp 40 will require corresponding power increases to lamps 36 and 38. Alternatively, increasing the power to lamps 36 and 38 may be dispensed with if the exposure interval is increased to compensate for the decreased intensity of the light emanating from the output end 70 of the mixing device 50.

Up to this point the invention has been illustrated by a color variable light source having three light sources whose intensities may be varied independently, in combination with a fiber optic light-mixing device formed by three incoherent bundles of optic fibers having input ends for receiving the light output of the three sources and a common systematically interwoven output end for integrating the light output of the three sources in an additive manner.

Figure 4A:
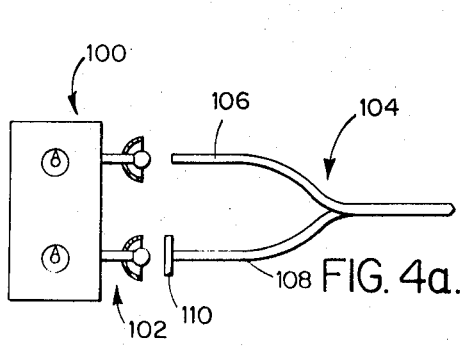
FIGS. 4a and b are diagrammatic representations of alternative embodiments of the instant invention.

It will be understood that the same basic principles disclosed above may be applied to other types of light sources. For example, FIG. 4a shows a color variable light source formed by two light sources 100 and 102 in combination with a fiber optic light-mixing device 104 formed by two incoherent bundles 106 and 108 of optic fibers interwoven in the manner described previously. One application for this type of structure is to additively mix "white" light from source 100 with colored light from source 102, provided by inserting a pack 110 of subtractive color filters (yellow, cyan, and magenta) between the lamp of source 102 and the input end of incoherent bundle 108. In this manner the composite color output is a mixture of "white" light and light colored by the filter pack 110. This type of structure gives the operator much more flexibility and finer control in balancing the color of his light source than he would have if he were using the subtractive filters alone.

Another application relates to black-and-white printing using variable contrast filters. By mixing the "white" light of source 100 with the light of source 102 colored by one or more variable contrast filters 110, the operator may compensate for light losses due to the filters by increasing the intensity of the composite light output to shorten exposure time.

Figure 4B:
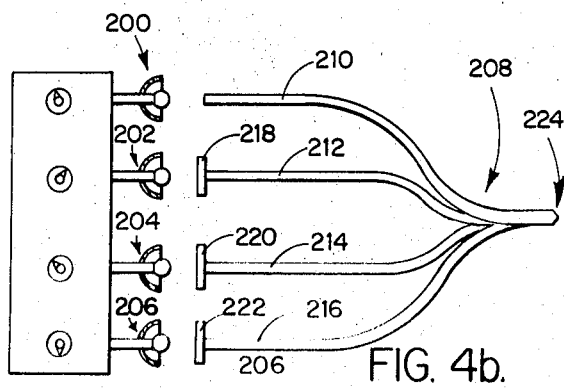

FIG. 4b diagrammatically illustrates another alternative embodiment employing four light sources 200, 202, 204, and 206, in combination with a fiber optic mixing device 208 formed by four incoherent fiber optic bundles 210, 212, 214, and 216. As in the previously described embodiment, the intensity of each of the four light sources may be varied independently of one another. Light source 200 provides "white" light. Sources 202, 204, and 206 provide red, green, and blue light, respectively, by positioning appropriate colored filters 218, 220, and 220 between their lamps and the input ends of their respective fiber optic bundles 212, 214, and 216.

The composite output end 224 of the fiber optic mixing device 208 is formed by systematically interweaving the individual fibers of the four incoherent bundles. The fibers are arranged to form a reseau or mosaic having a repeating pattern of clusters of four fibers, each cluster including fibers for transmitting "white", red, green, and blue light.

By adding a fourth light source and fourth incoherent bundle to the mixing device, the total light output of the mixing device, at the composite output end 224, is increased thereby permitting shorter exposure times.

One skilled in the art will appreciate that many other embodiments of the additive light source may be constructed to suit particular applications. For example, a larger number of lamps, filters, and incoherent bundles may be employed. This type of structure allows the individual lamps to be of the low wattage type rather than using fewer high wattage lamps.

Regardless of the number of lamps and incoherent bundles, or the number of fibers forming each bundle (i.e., one bundle forming part of a mixing device may contain fewer or more individual fibers than another bundle) in any given mixing device, the basic principles are still the same. The additive light source will include two or more light sources of at least two different colors, means for independently varying the intensities of each of the light sources, and a fiber optic mixing device comprising a plurality of incoherent bundles of optic fibers, one for each light source, interwoven at their output ends to establish a systematic array of fibers such that the different color lights are intermixed to form a composite color light at a point slightly beyond the output end of the fiber optic mixing device.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A variable color light source for illuminating negatives in a photographic printer, said variable color light source comprising:

means for receiving a plurality of individual light sources, each providing light of a different color;

means for independently varying the intensity of said different colored light provided by each of said plurality of light sources; and means for receiving said different colored light from each of said plurality of light sources and for combining said different colored light to provide light for a composite color representing an additive mixture of independent intensities of said different colored light;

said receiving and combining means including a plurality of bundles of individual light transmitting optic fibers, the number of said bundles being equal to the number of said light sources, each of said plurality of bundles having an input end and an output end, said input ends of each of said plurality of bundles being optically coupled, respectively, to one of said plurality of light sources for receiving said light of different colors for transmission through said plurality of bundles to their respective ends;

said output ends of said plurality of bundles being integrated with one another to form a composite output end of said receiving and combining means, said individual optic fibers of said plurality of bundles being interwoven to form a systematically ordered array of fibers, selected alternatively from said composite output end to form light of a substantially composite color for illuminating the negatives, said individual fibers of each of said plurality of bundles being randomly arranged such that light received at their respective input ends is transmitted to said ordered array at said composite output end in an incoherent manner.

2. A variable color light source as defined in claim 1 wherein said plurality of individual light sources includes a source of red light, a source of green light, and a source of blue light and said receiving and combining means include first, second, and third bundles of optic fibers having their respective input ends optically coupled, respectively, to said sources of red, green, and blue light.

3. A variable color light source as defined in claim 1 wherein said individual fibers of said plurality of bundles are systematically arranged at said composite output end of said receiving and combining means in substantially parallel, adjacent, interdigitated rows, each of said rows having a repeating sequence of fibers selected alternatively from said individual fibers of said plurality of bundles, and said adjacent rows being configured to provide a repeating array of clusters of fibers at said composite output end, each of said clusters including one fiber from each of said plurality of bundles.

4. A variable color light source as defined in claim 1 wherein said light receiving and combining means includes a longitudinal light transmission axis and said ordered array of fibers at said composite output end is configured to include a plurality of surfaces which are inclined with respect to said light transmission axis for directing light of a composite color outwardly from said light transmission axis.

5. A variable color light source as defined in claim 1 wherein said plurality of independent light sources includes at least a first light source providing light of one color and a second light source providing light of a color different from said one color.

6. A variable color light source as defined in claim 1 wherein each of said individual optic fibers includes an inner core having a first index of refraction and an outer sheath, covering said core, having a second index of refraction which is lower than said first index of refraction.

7. A variable color light source as defined in claim 1 wherein said plurality of individual light sources includes at least a source of red light, a source of green light, a source of blue light, and a source of white light.

8. A variable color light source as defined in claim 1 where each of said plurality of individual light sources includes an electrically powered lamp and said means connected to each of said plurality of individual light sources includes means for independently varying the power input to each of said lamps.

9. A variable color light source as defined in claim 8 wherein said means for independently varying the power input to each of said lamps includes means for varying the voltage input to each of said lamps.

10. A variable color light source as defined in claim 8 wherein each of said plurality of independent light sources includes a filter for transmitting light of a different color, said filters being positioned between said lamps and the input end of said bundle associated with each lamp.

11. A variable color light source for illuminating negatives in a photographic printer, said variable color light source comprising:

means for receiving sources of red, green, and blue light;

means for independently varying the intensity of said red, green, and blue light; and means for receiving and combining said red, green, and blue light to produce light of a composite color representing an additive mixture of said independent intensities of said red, said green, and said blue light;

said receiving and combining means including first, second, and third bundles of individual light transmitting optic fibers, each of said bundles having an input end and an output end, said input ends of said first, second, and third bundles being optically coupled, respectively, to said sources of red, green, and blue light for receiving said red, said green, and said blue light for transmission through said first, second, and third bundles to their respective output ends;

said output ends of said first, second, and third bundles being systematically interwoven to form an ordered array of fibers, selected alternatively from said first, second and third bundles, such that said red, green, and blue light intermixes when transmitted from said composite output end to form light of a composite color for illuminating the negatives, said individual fibers of each of said first, second, and third bundles being randomly arranged therein such that light received at their respective input ends is transmitted to said ordered array at said composite output end in an incoherent manner.

12. A variable color light source as defined in claim 11 wherein said individual fibers of said first, second and third bundles are systematically arranged at said composite output end of said receiving and combining means in substantially parallel, adjacent, interdigitated rows, each of said rows having therein a repeating sequence of fibers selected alternatively from said individual fibers of said first, second, and third bundles and said adjacent rows being configured to provide a repeating array of clusters of fibers at said composite output end, each of said clusters including three fibers, one of each being selected from said individual fibers of said first, second, and third bundles.

13. A variable color light source as defined in claim 11 wherein said receiving and combining means includes a longitudinal light transmission axis and said ordered array at said composite output end is configured to include a plurality of surfaces which are inclined with respect to said light transmission axis for directing light of a composite color outwardly from said light transmission axis.

14. A variable color light source as defined in claim 11 when said sources of red, green, and blue light each include a lamp associated therewith and an electrical power supply for supplying electrical power to each of said lamps and said means for independently varying the intensity of each of said red, green, and blue light sources includes means associated with said power supply for independently varying the power input to each of said lamps.

15. A variable color light source as defined in claim 14 wherein said means for independently varying the power input to each of said lamps includes means for varying the voltage input to each of said lamps.

16. A variable color light source as defined in claim 14 wherein said source of red light further includes a red light transmitting filter positioned between said lamp of said red light source and said input end of said first bundle of optic fibers and said green and blue light sources include, respectively, a green light transmitting filter and a blue light transmitting filter positioned, respectively, between said lamp of said green light source and said input end of said second bundle of optic fibers and said lamp of said blue light source and said input end of said third bundle of optic fibers.

17. A variable color light source as defined in claim 11 wherein each of said individual optic fibers includes an inner core having a first index of refraction and an outer sheath, covering said inner core, having a second index of refraction which is lower than said first index of refraction.

18. A variable color light source as defined in claim 11 wherein said composite output end of said receiving and combining means is configured to have facets thereon for dispersing the light of a composite color.

19. A fiber optic light-mixing device for receiving light from a plurality of independent light sources, each of the light sources being configured to provide light of a different color and also being configured to have the intensity of its light output varied independently from the light output of the other light sources, and for combining the different colored light to produce light of a composite color representing an additive mixture of said independent intensities of the different colored light, said fiber optic light-mixing device comprising:
a plurality of incoherent bundles of individual optic fibers, the number of said incoherent bundles being equal to the number of the plurality of light sources, each of said incoherent bundles having an input end and an output end, said input ends of each of said plurality of incoherent bundles being adapted to be optically coupled, respectively, to one of the plurality of light sources for receiving the different colored light for transmission through said plurality of incoherent bundles to their respective output ends;
said output ends of said plurality of incoherent bundles being integrated with one another to form a composite output end of said fiber optic light mixing device by said individual optic fibers of said plurality of incoherent bundles being systematically interwoven to form an ordered array of fibers, selected alternatively from each of said plurality of incoherent bundles, such that the light of different colors intermixes when transmitted from said composite output end to form light of a composite color, said individual fibers of each of said plurality of incoherent bundles being randomly arranged therein such that light received at the respective input ends is transmitted to said ordered array at said composite output end in an incoherent manner.

20. A fiber optic light-mixing device as defined in claim 19 wherein there are at least first and second light sources each providing light of a different color and said light-mixing device includes a first incoherent bundle of optic fibers having its input end optically coupled to the first light source and a second incoherent bundle of optic fibers having its input end optically coupled to the second light source.

21. A fiber optic light-mixing device as defined in claim 20 wherein a plurality of independent light sources includes a source of red light, a source of green light, and a source of blue light and said light-mixing device includes first, second and third incoherent bundles of optic fibers having their respective input ends optically coupled, respectively, to the sources of red, green, and blue light.

22. A fiber optic light-mixing device as defined in claim 19 wherein said individual fibers of said plurality of incoherent bundles are systematically arranged at said composite output end of said light-mixing device in parallel, adjacent, interdigitated rows, each of said rows having a repeating sequence of fibers selected alternatively from said individual fibers of said plurality of incoherent bundles, said adjacent rows being configured to provide a repeating array of clusters of fibers at said composite output end, each of said clusters including one fiber from each of said plurality of incoherent bundles.

23. A color mixing device as defined in claim 19 wherein said light-mixing device includes a longitudinal light transmission axis and said ordered array at said composite output end is configured to include a plurality of surfaces which are inclined with respect to said light transmission axis for directing light of a composite color outwardly from said light transmission axis.

24. A fiber optic light-mixing device as defined in claim 19 wherein said individual optic fibers include an inner core having a first index of refraction and an outer sheath, covering said inner core, having a second index of refraction which is lower than said first index of refraction.

25. A photographic printer for exposing photosensitive material to an image of an illuminated transparency, said photographic printer comprising:
means for supporting photosensitive material;
means for supporting a transparency in alignment with the photosensitive material;

a projection lens positioned between said photosensitive material and transparency support means for projecting an image of a transparency supported by said transparency support means onto the photosensitive material supported by said photosensitive material support means; and a variable color light source for illuminating the transparency such that an image thereof may be projected onto the photosensitive material by said projection lens;

said color variable light source comprising;

means for receiving a plurality of individual light sources, each providing light of a different color;

means connected to each of said plurality of light sources for independently varying the intensity of said different colored light provided by each of said plurality of light sources; and means for receiving said different colored light from each of said plurality of light sources and for combining said different colored light to produce light of a composite color representing an additive mixture of various intensities of said different colored light;

said receiving and combining means including a plurality of bundles of individual light transmitting optic fibers, the number of bundles being equal to the number of said plurality of independent light sources, each of said bundles having an input end and an output end, said input ends of each of said plurality of bundles being optically coupled, respectively, to one of said plurality of light sources for receiving said light of different colors for transmission through said plurality of bundles to their respective output ends;

said output ends of said plurality of bundles being integrated with one another to form a composite output end of said receiving and combining means by systematically interweaving said individual optic fibers of said plurality of bundles to form an ordered array of fibers, selected alternatively from each of said plurality of bundles, such that said light of different colors intermixes when transmitted from said composite output end to form light of a composite color for illuminating the negative, said individual fibers of each of said plurality of bundles being randomly arranged therein such that light received at their respective input ends is transmitted to said ordered array at said composite output end in an incoherent manner.

26. The photographic printer as defined in claim 25 wherein said plurality of independent light sources includes sources of red, green, and blue light and said plurality of bundles of optic fibers includes first, second, and third bundles having their respective input ends optically coupled, respectively, to said sources of red, green, and blue light.

27. The printer of claim 25 further including at least one condensing lens positioned between said composite output end and said means for supporting a negative.

28. A printer of claim 27 where said composite output end has facets thereon for dispersing the light of a composite color such that it completely fills said condensing lens.

29. A printer of claim 27 further including a negative lens between said composite output end and said at least one condensing lens for further dispersing said light of a composite color.

* * * * *